Patented Oct. 23, 1928.

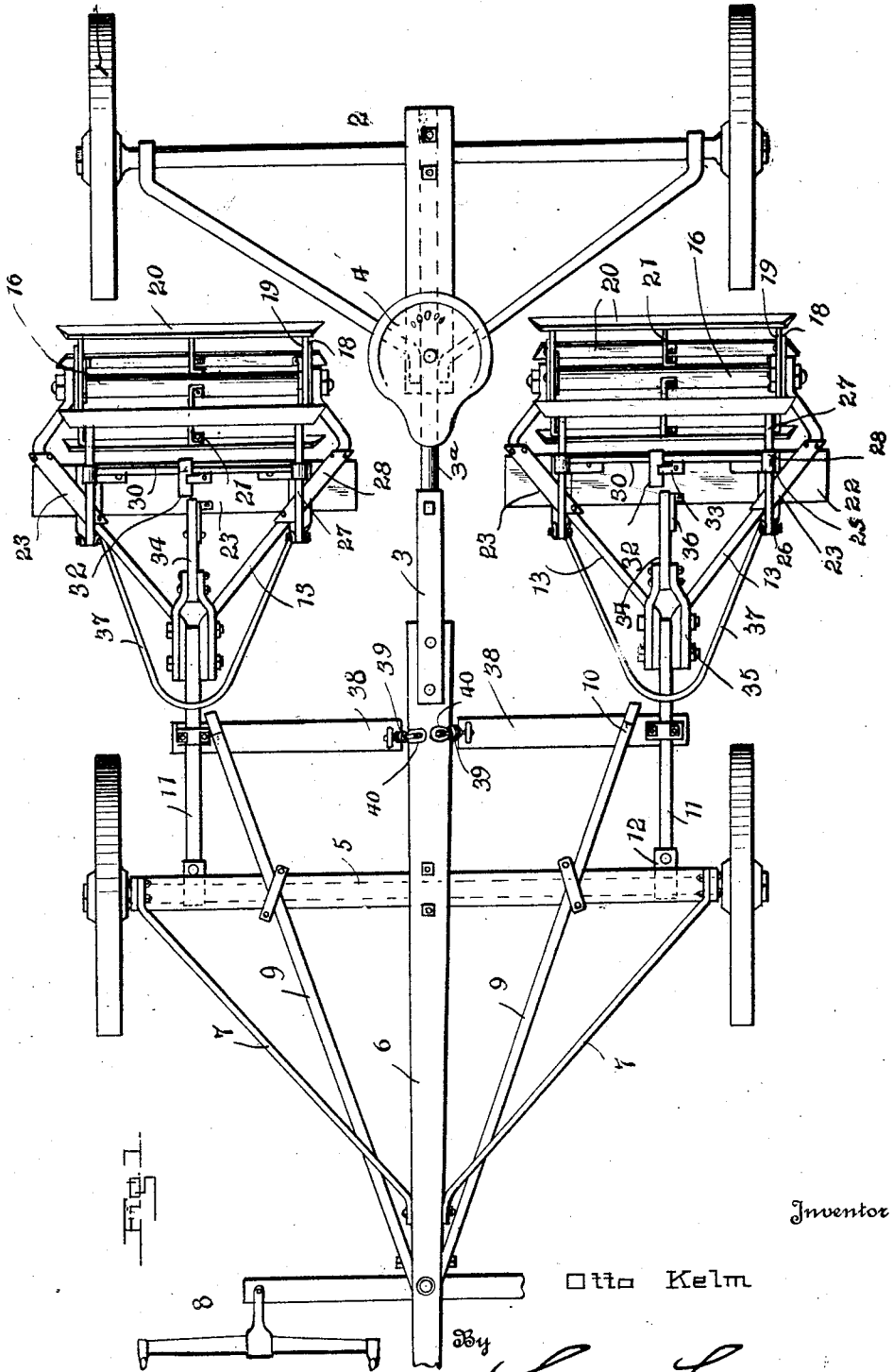

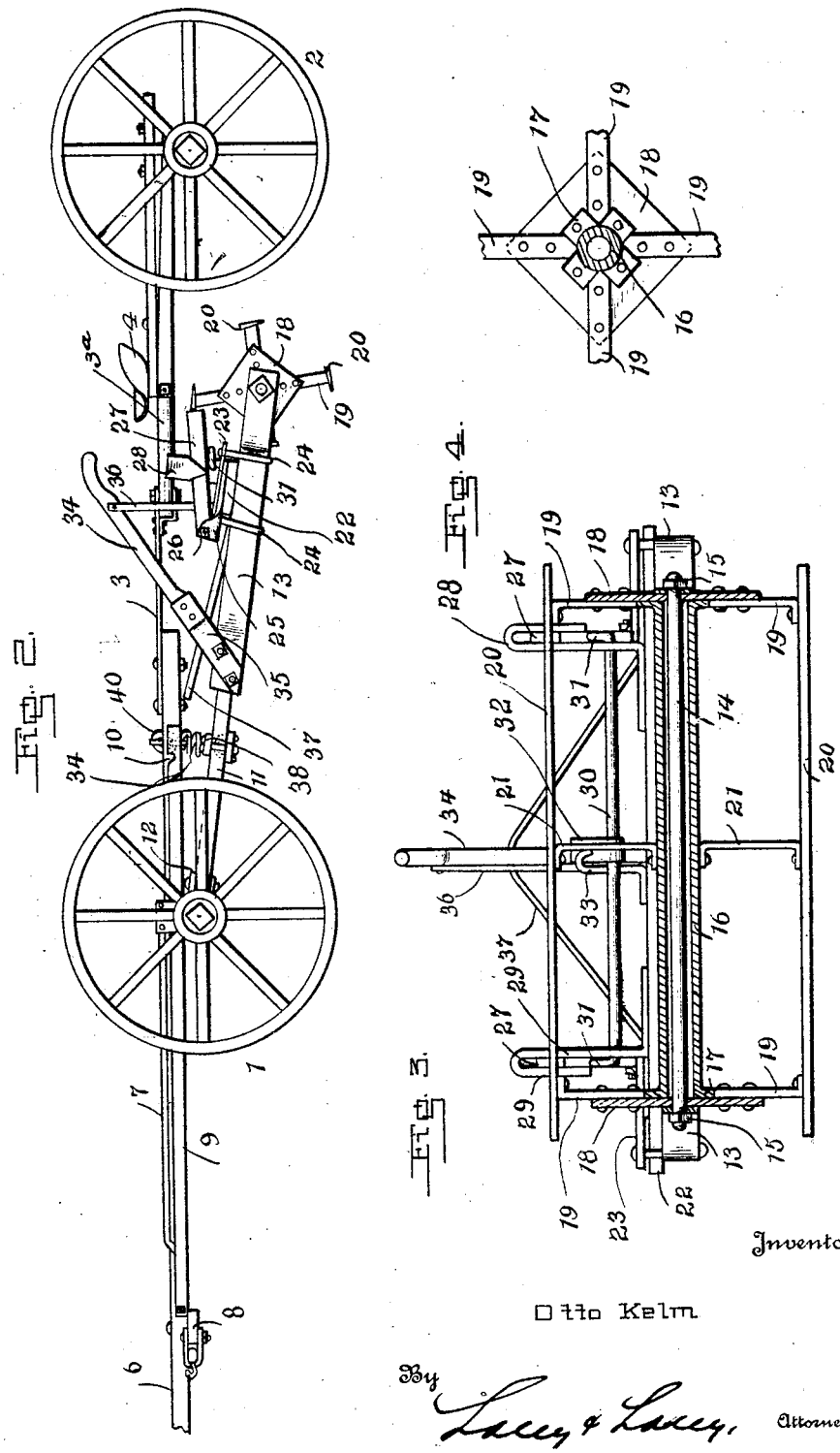

1,688,463

UNITED STATES PATENT OFFICE.

OTTO KELM, OF MALCOM, IOWA.

WEED AND VINE DESTROYER.

Application filed October 6, 1926. Serial No. 139,924.

This invention is a machine for destroying obnoxious vines and weeds which spring up between the rows of growing plants and tend to retard and destroy the crop. The invention has for its object the provision of a simple and inexpensive structure which will operate efficiently to cut through the obnoxious growth which may be gathered or permitted to dry on the ground and dug or plowed into the same to enrich the soil. The invention also provides means whereby the weed-cutting elements may be easily tripped to clear an accumulation and simultaneously be brought in position to resume the cutting operation. Other objects of the invention will appear incidentally in the course of the following description, and the invention resides in certain novel features which will be particularly pointed out in the appended claims.

In the accompanying drawings:

Figure 1 is a plan view of one embodiment of my invention;

Fig. 2 is a side elevation of the same;

Fig. 3 is an enlarged sectional elevation through the cutting drum, and

Fig. 4 is an enlarged detail sectional elevation more particularly showing the hub structure.

In the illustrated embodiment of the invention, there is provided a front truck 1 and a rear truck 2 which may be of any approved or convenient construction and which are connected by a reach or coupling bar 3 to which the front end of the tongue 3ª of the rear truck is pivoted to permit the machine to make a short turn. These trucks are employed most advantageously when the apparatus of my invention is employed for operating simultaneously in two paths so as to destroy the deleterious growth at two sides of a row or in the spaces between three adjoining rows, and the rear truck carries a driver's seat 4. The front truck comprises an axle structure, indicated at 5, and ground wheels mounted at the ends of the axles, together with a draft and steering tongue 6 which is connected with the axle by braces 7 and carries draft devices, indicated at 8. Secured to the tongue 6 at a point in advance of the axle structure 5 and diverging rearwardly are bars 9 which have their rear ends extended beyond the axle and provided with notches 10 in their upper sides for a purpose which will presently appear.

In applying the invention to such a truck as is illustrated and which has been briefly described, I employ a beam or tongue 11 which is connected at its front end with the axle structure 5 through a coupling 12 whereby the beam may be given both lateral and vertical movement. To the rear end of the beam 11, I secure rearwardly diverging arms 13 which have their rear ends suitably constructed to receive a rod 14 which is held against endwise movement by nuts 15 fitted upon its ends and turned home against the outer sides of the rear end portions of said beams. Housing the said rod 14 is a sleeve 16 which may rotate about the said rod and is provided at its ends with radially disposed lugs 17 to which are secured hub plates 18, the said hub plates being preferably rectangular, as clearly shown in Figs. 2 and 4. To these hub plates are rigidly secured the inner ends of radial arms or spokes 19 which are arranged in pairs, that is to say, a radial arm or spoke at one end of the sleeve 16 alines axially of said sleeve with a corresponding arm or spoke at the opposite end of the sleeve. To the outer ends of the corresponding spokes, I rigidly secure the knives 20 which extend the full length of the sleeve and may project beyond the ends of the sleeve, as shown in Fig. 3. These knives each have one longitudinal edge beveled to form a cutting edge and the said edge is at the front when the blade is in its lowered position. To prevent bending of the blades under load imposed thereon, additional spokes 21 are provided midway the ends thereof, and these spokes are secured rigidly to the sleeve 16 and the blades respectively. The hub plates 18 are supported directly by the axle rod 14 but are free to rotate thereon so as to bring a blade into position to run along the surface of the ground or slightly below the surface so as to cut through the vines, weeds or other obnoxious growths.

In advance of the rotatable cutting drum, I provide a platform or support 22 which may conveniently be a flat board resting at its end portions upon the diverging beams 13 and secured firmly thereon by clip plates 23 disposed across the platform and secured thereto by clip bolts 24 in an obvious manner. The said clips also serve to secure upon the platform or rest brackets 25 having upstanding lugs 26 at their front ends to which are pivoted the rearwardly extending dogs or latches 27, the said latches being of such length that their rear ends project rearwardly beyond the platform 22 into the paths of the knives 20 so that, when the cutting drum is permitted to rotate, the latches will be engaged by the butt edge of one of the knives and the movement of the drum will be thereby limited and controlled. The dogs or latches 27 are held against lateral movement by guides 28 secured rigidly upon the rest or platform 22 and rising therefrom and presenting parallel vertical side members 29 between which the respective dogs or latches may play. The lower portions of the guides 28 are utilized as end bearings for a rock shaft 30 arranged above the platform 22 and adjacent the rear edge thereof and having rearwardly projecting cranks 31 at its ends which are disposed below the respective dogs 27 and in contact with the under edges thereof. A pedal 32 is secured to this rock shaft at the center thereof and projects forwardly from the platform under a stop bracket 33 which is secured upon the platform and may be of any convenient form. The weight of the dogs or latches 27 is always imposed upon the cranks 31 and, consequently, tends to swing the said cranks downwardly so that the pedal 32 is turned upwardly. The stop bracket 33 limits the upward movement of the pedal 32 and the corresponding movement of the rock shaft so that the cranks 31 will be held in the proper position to normally sustain the dogs or latches in the path of the knives 20. This position is illustrated in the drawings.

In use, the machine is driven over the field along the rows of young plants with a knife 20 running along the surface of the ground or slightly below the surface, as indicated in Fig. 2. The cutting edge of this knife will, consequently, be brought into contact with the vines and weeds and will cut through the same and will also act to lift them from the soil, it being noted that the spokes 19 carrying the active blade are not vertical but are slightly inclined forward so that the blade is tilted slightly and does not run horizontally. If the vines and weeds should accumulate upon the blade and tend to clog the action of the same, the driver presses upon the pedal 32 so as to rock the shaft 30 and swing the cranks 31 upwardly thereby lifting the dogs or latches 27 away from the uppermost knife 20 and permitting the cutter drum to rotate through its tractive engagement with the ground. The pressure upon the pedal 32 is immediately released so that the weight of the cranks and the latches will at once return them to the illustrated position and insure the engagement of the latches by the butt edge of the knife which was previously at the rear, the rotation of the drum being thereby restricted to a quarter turn so that the knife previously at the front and next to the active knife will be brought into active position.

A lifting bar 34 is secured at its forward end to a yoke 35 which spans and is secured to the front ends of the beams 13 and the rear end portion of this lifting bar is connected by a link 36 with the platform 22 so that, when the weed cutter is to be carried over a road or moved from field to field, the drum may be easily lifted so that the knives will not come in contact with the ground, and to support the apparatus in this raised position a bail 37 is secured to and projects forwardly from the platform 22 and has its front end disposed in position to engage in the notch 10 of the beams 9 so that the machine will be supported in the raised position and may be freely carried over a road without causing damage to the road or to any of the working mechanism.

It is obviously desirable to provide foot rests for the convenience or comfort of the driver. The inner ends of the platforms 22 are utilized for this purpose but the pressure is applied to the inner ends of the cutter drums so that the drums tend to tilt and, consequently, the several knives will not act evenly upon the ground and will fail to cut through all the weeds or vines in their path. Furthermore, this tilting of the blades increases the draft of the machine inasmuch as the inner ends of the blades will tend to dig into the ground while the outer ends thereof will be clear of the ground. To overcome these objections, I provide the equalizers 38 which may be plates secured rigidly at their outer ends to the respective beams 11 and having their inner ends disposed adjacent the steering pole or draft tongue 6. Springs 39 are attached to the inner ends of the equalizers and are connected with the tongue by chains or other flexible connections 40 so that these springs tend to lift the inner ends of the equalizers and impart to the cutting drum frame a tilting in opposition to that resulting from the weight of the driver's feet upon the platforms 22 so that the tendency of the inner ends of the knives to dig into the ground will be counteracted and the blades will be presented in a substantially horizontal plane to the growths which it is desired to eliminate.

It will be understood that the drum may be made in various lengths and the machine may be arranged to operate as a single row machine, and it is contemplated to furnish the axle bars 14 and the sleeve 16 in several lengths so that the owner of the apparatus may easily arrange the same for use as a single row machine or as a double row machine. It is also contemplated to provide short blades so that the device may be used as a hand machine, draft being applied by hand through the beam 11 or the arms 13 or some similar attachment. When using the device as a hand machine, a short bar or some similar implement may be carried so that pressure may be exerted through said bar by hand upon the pedal 32 to release accumulations when necessary. It will be understood that, when using the device as a single row machine, the driver may utilize the platform 22 as foot rests and the yieldably supported equalizer 38 will not be necessary. The device is obviously simple in the construction and arrangement of its parts and may be produced and maintained at a slight expense.

Having thus described the invention, I claim:

1. An apparatus for the purpose set forth comprising a frame, a rotatably mounted drum carrying a plurality of axially extending knives, dogs pivoted at their front ends on the frame in advance of the drum and extending rearwardly into the upper portion of the orbital path of the knives whereby their rear ends may abut the uppermost knife, releasing devices arranged below the dogs and in advance of the drum and upon which the free ends of the dogs rest, and means for actuating said releasing devices whereby to lift the dogs from the orbital path of the knives.

2. An apparatus for the purpose set forth comprising a frame, a cutting drum rotatably mounted in the rear end of the frame and including hub members, spokes extending from the hub members and knives secured to and extending between corresponding spokes, dogs pivotally mounted upon the frame above and in advance of the drum and extending rearwardly to project into the upper portion of the orbital path of the knives whereby to be engaged at their rear ends by the uppermost knife, means to prevent lateral movement of the dogs, cranks supported on the frame below the respective dogs and engaging the under sides of the dogs to support the same, and means for rocking said cranks upwardly to lift the dogs from the uppermost knife.

3. An apparatus for the purpose set forth comprising a frame, a drum rotatably mounted at the rear end of the frame and including a plurality of axially extending knives, dogs pivoted upon the frame in advance of the drum and extending rearwardly to project their free ends into the orbital path of the knives, a rock shaft mounted on the frame, cranks at the ends of the rock shaft bearing against the under sides of the dogs to support the free ends thereof, a pedal upon the rock shaft between the ends thereof, the weight of the dogs tending to swing the pedals upwardly, and a stop mounted on the frame and projecting over the said pedal.

4. The combination with a truck, of frames connected with the truck at opposite sides of the center thereof, cutting drums carried by the said frames, foot rests on the frames at the inner ends of the respective drums, plates secured rigidly to the said frames in advance of the drums and extending inwardly therefrom, and resilient connections between the inner ends of said equalizer elements and the truck and exerting their force upwardly in opposition to the pressure upon the foot rests.

In testimony whereof I affix my signature.

OTTO KELM. [L. S.]